United States Patent [19]
Müller

[11] Patent Number: 4,795,368
[45] Date of Patent: Jan. 3, 1989

[54] CONNECTOR ASSEMBLY FOR WIDE BAND COMMUNICATIONS CABLES

[75] Inventor: Siegfried Müller, Hagen, Fed. Rep. of Germany

[73] Assignee: Walter Rose GmbH & Co. KG., Hagen, Fed. Rep. of Germany

[21] Appl. No.: 65,621

[22] Filed: Jun. 23, 1987

Related U.S. Application Data

[63] Continuation of Ser. No. 777,594, Sep. 19, 1985, abandoned.

[30] Foreign Application Priority Data

Sep. 22, 1984 [DE] Fed. Rep. of Germany ....... 3434826

[51] Int. Cl.$^4$ ............................................ H01R 13/52
[52] U.S. Cl. .................................... 439/523; 439/932
[58] Field of Search ..................... 439/571, 573, 932

[56] References Cited

U.S. PATENT DOCUMENTS

| | | | |
|---|---|---|---|
| 3,305,625 | 2/1967 | Ellis | 339/116 R |
| 3,395,382 | 7/1968 | Weagant | 339/116 R |
| 3,467,768 | 9/1969 | Shorey | 339/116 C |
| 4,382,653 | 5/1983 | Blanchard | 339/143 R |
| 4,437,719 | 3/1984 | Miyamoto | 339/116 C |

Primary Examiner—Eugene F. Desmond
Attorney, Agent, or Firm—Toren, McGeady & Associates

[57] ABSTRACT

A device for enabling distribution, branching off and/or connecting of wide band communications cables, wherein a metallic housing which consists essentially of an electroplate and which has connecting sockets for receiving therein cable ends of cables to be connected is arranged with the connecting sockets being only at a side of the housing which is located at the top in the installed position of the connecting assembly. The cables have covers which are installed in the sockets and a sheathing is provided for the housing. A connection between the connecting sockets, on the one hand, and the cable covers of the installed cables on the other, as well as the sheathing for the housing is accomplished by shrinkable plastic material.

5 Claims, 2 Drawing Sheets

CONNECTOR ASSEMBLY FOR WIDE BAND COMMUNICATIONS CABLES

This is a continuation of application Ser. No. 777,594 filed Sept. 19, 1985, now abandoned.

The present invention is directed generally to connecting assemblies and more particularly to a device for enabling distribution, branching off and/or connecting of wide band communications cables with a metallic housing. The device of the invention comprises connecting sockets for receiving cable ends and an electroplate, whereby the connection between the connecting sockets on the one hand and the cable jackets of the inserted cables on the other hand, as well as the sheathing of the housing, is accomplished with the use of shrinkable plastic material.

In the prior art, there is known from DE-OS No. 31 27 869 an assembly set with a species conforming device. There, a metallic housing comprising an electroplate exhibits, respectively, two cable inputs at two front faces which are arranged to lie opposite one another. The housing and the cable inputs are also enclosed by shrink sealing box halves which extend beyond the cable inputs. After insertion of suitably thinned coaxial cables into the cable connecting sockets, the cable input sockets are heated at the shrinking sealing box and, thus, they come to rest upon the outer jacket of the coaxial cable.

This known assembly displays significant advantages as compared with other types of devices. However, a particularly significant disadvantage of this known device is that it requires a comparatively large space in cable shafts and that the shrunk sealing boxes which are inserted and which surround the housing must be formed of comparatively expensive injection molded parts.

Accordingly, the present invention is directed towards providing a solution to the prior art disadvantages which, first of all, will diminish space requirements for installation involving placement of connections of coaxial cable ends and, secondly, wherein the parts to be inserted may be formed in a simpler manner from shrinkable material.

SUMMARY OF THE INVENTION

In accordance with the present invention, the difficulties and disadvantages of the prior art are solved in such a manner that the connecting sockets in the installation position of the device are all arranged at the side of the housing which is facing upwardly or toward the top thereof. It has been shown that this manner of designing the housing provides a series of advantages as opposed to known structures, particularly with regard to simplifying the installation, since all the cable ends which are reduced in diameter must be introduced only from one side into the device by an operator or mechanic. Also, this type of device requires much less space in the cable shaft because it can be attached to the wall or placed on the floor. The cables which are introduced or connected are required to undergo only small redirectional bends and, at the same time, it is made possible thereby to form the jackets from plastic material in a much simpler manner. Contrary to the prior art, one part with specially molded cable outlets is required and thereby the need for two parts is eliminated.

In accordance with a further development of the invention, it is provided that the area of the device carrying the connecting sockets is covered with a termination hood made from nonshrinkable material, whereby this termination hood has a number of adaptation sockets corresponding to the number of the connecting sockets and enclosing them.

In accordance with the invention, it is possible, for example, that a termination hood can be fabricated from nonshrinkable material, for example, as an injection molding, while the other parts of the sheathing of the device may consist of parts which are very easy to shape.

The connection between the pipe adapters of a termination hood and the coaxial cables introduced can be accomplished by means of short shrinkable hoses since again there is involved a simple component with inherent fabrication advantages.

Additionally, it may also be provided that the pipe adapters of the termination hood are designed so as to be at least partially heat shrinkable in the areas adjoining with the free ends.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF A PREFERRED EMBODIMENT

Figure 1:
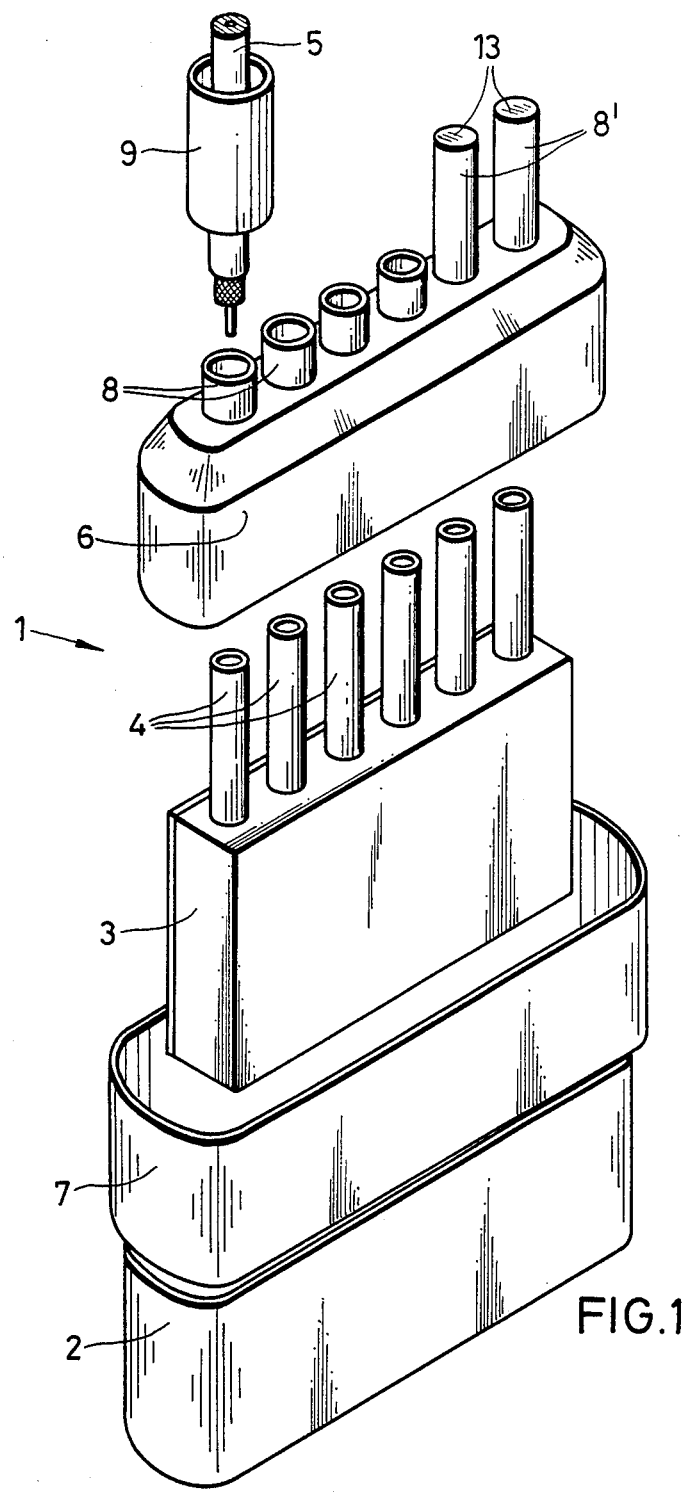
FIG. 1 is an exploded view showing an assembly in accordance with the present invention.

Referring now to the drawings, the present invention is essentially embodied in a connecting assembly 1 shown in detail in FIG. 1. In the connecting assembly 1, there is provided a receiving element 2 which is arranged at the bottom of the assembly and which is made of plastic material. A housing 3 is insertable in the receiving element 2 and the housing 3 comprises an electroplate which is not shown in detail and which is adapted to the respective area of utilization. This is unimportant for the present invention.

The housing 3 comprises a plurality of connecting sockets 4 which are adapted to receive coaxial cables 5 shown at the top of FIG. 1. In the example depicted, six connecting sockets 4 are shown, but it is to be understood that other numbers are possible.

In the utilization position of the assembly, a termination hood or cover 6 covers the area with the connecting sockets 4 which in the example depicted is to be produced from nonshrinkable material. When the different parts are assembled, this termination hood 6 can either abut onto the receiving part 2 or it can cover it or it can also be partially covered by the edges of the part 2.

The connection between the end hood 6 and the covering part 2 is accomplished by means of a shrunk-in slip hose piece 7 which, after assembly of the structural parts, covers these parts at least partially and connects them together by means of the shrinking effect.

The slip hose piece 7 can also be molded at the cover piece 2 as a shrinking sleeve so as to form one piece therewith.

After the introduction of the coaxial cable 5, the connection may be effected in a similar fashion with pipe adapters 8 molded on the end or termination hood 6, namely by means of individual slip hose pieces 9.

The hood or end piece 6, if it is manufactured from plastic material, can be prepared during production so that the pipe adapters 8 are closed off by closing covers 13. The adapters 8 may be opened at the installation site by cutting off the covers 13 from a number of adapters 8 corresponding to the number of connecting sockets 4 which are to be installed.

Naturally, the covering hood 6 may also be fabricated from a corrosion protecting metal, for example, aluminum, and it can also be made from plastic material with a metallic supporting member (not shown) provided on the inside thereof.

Figure 2:
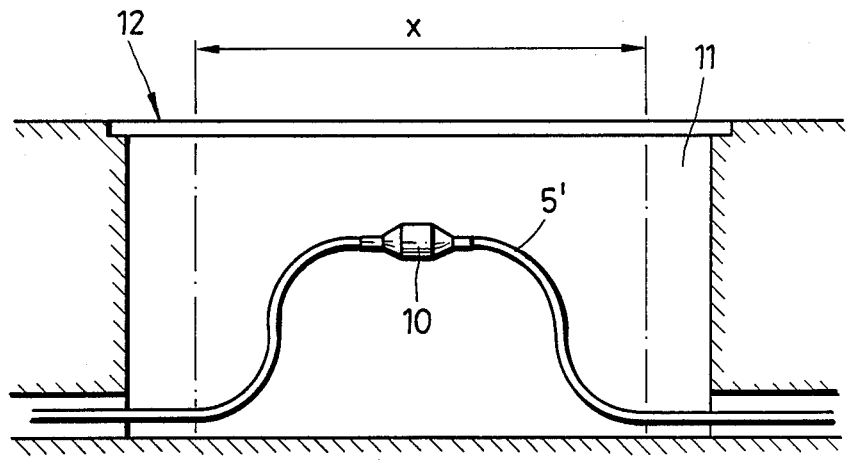
FIG. 2 is an elevational view showing an installation situation of a device in a cable shaft in accordance with the state of the art.
Figure 3:
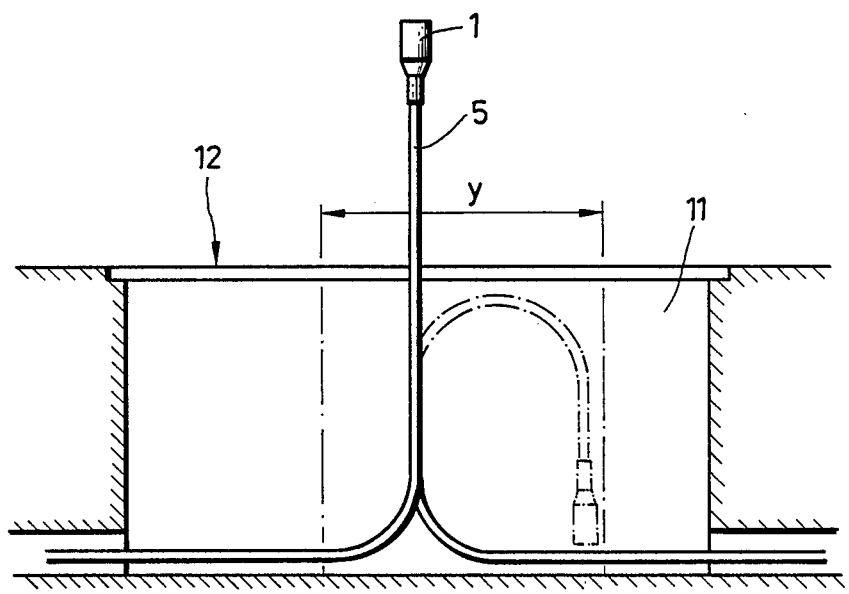
FIG. 3 is an elevational view showing an installation situation similar to that shown in FIG. 2 in a cable shaft, wherein there is utilized a device in accordance with the present invention.

In FIGS. 2 and 3, there are shown installation facilities in accordance both with the state of the art and with the invention. In FIG. 2, there is shown a connection box according to the state of the art which has been designated with reference numeral 10, the cable shaft having been identified with reference numeral 11. As will be seen from FIG. 2, with connection technology in accordance with the prior art, there is required at least a width of a cable shaft corresponding to the dimension x shown in FIG. 2. The installation is performed below the ground surface 12.

In FIG. 3, there is shown an installation in accordance with the present invention. If a comparison is drawn between the prior art installation of FIG. 2 and the installation in accordance with the present invention as shown in FIG. 3, then it will be seen that by utilization of the connecting assembly 1 in accordance with the invention, the installation dimension here is considerably reduced, and the dimension is indicated by the reference character y. It will also be seen that the installation may be accomplished above the ground surface 12 or above the channel cover, which clearly simplifies handling of the equipment.

Naturally, the embodiment described herein may be changed in many respects without departing from the basic concepts of the invention. The connecting sockets 4 can also be arranged at another side of the housing 3 in accordance with the construction and utilization area of the installation. It is essential that the connecting sockets be only arranged at one side only of the device.

Thus, in accordance with the invention, it will be seen that there is provided a device for the distribution and/or branching off and/or connecting of wide band communications cables with a metallic housing comprising connecting sockets for installation of cable ends and an electroplate, whereby the connection of the connecting sockets on the one hand and the cable covers of the introduced cables on the other hand, as well as the sheathing of the housing, is achieved by shrinkable plastic material. In accordance with the invention, a solution is created with which, first of all, the space requirements of the installation and the placing of connections of coaxial cable ends is clearly reduced, and secondly, the parts made from shrinkable material which are to be inserted can be designed to be simpler.

This is achieved by arranging the connecting sockets 4 only on that side of the housing 3 which is at the top of the device or connecting assembly 1 in its installed position.

While a specific embodiment of the invention has been shown and described in detail to illustrate the application of the inventive principles, it will be understood that the invention may be embodied otherwise without departing from such principles.

What is claimed is:

1. A connection assembly for wide band communication coaxial cables comprising: a multi-sided metallic housing comprising an electroplate and having a first side with a plurality of connecting sockets in said first side for receiving therein selected ends of a plurality of coaxial cables extending outwardly from said first side, said housing arranged to interconnect said cables inserted therein; said coaxial cables having ends to be installed into said sockets; and means for enclosing said housing, said means for enclosing said housing includes a shrinkable plastic material; said first side of said housing containing said connecting sockets being arranged to face upwardly with said connecting sockets extending upwardly so that cable ends can be inserted downwardly into said connecting sockets in said first side of said housing.

2. As assembly according to claim 1, wherein an end hood made of nonshrinkable material is positioned over said housing and encircling said first side, a quantity of pipe adapters secured to and projecting from said end hood and corresponding to the quantity of connecting sockets with said pipe adapters fitted over and surrounding said sockets so that said cable ends are insertable through said pipe adapters into said connecting sockets.

3. An assembly according to claim 2, wherein said housing has second sides extending from and transversely of said first side to a third side opposite and spaced from said first side, said housing positioned within a receiving element with said third side and at least parts of said second sides located within said receiving element, said means laterally enclosing said end hood and enclosing said receiving element and comprising a sleeve of heat shrinkable material interconnecting said end hood and retaining element.

4. An assembly according to claim 2, wherein said pipe adapters on said end hood having free ends spaced outwardly from said end hood.

5. An assembly according to claim 4, wherein slip hose pieces are located on each said coaxial cable and fit over said pipe adapters, and said slip hose pieces are formed of a heat shrinkable material.

* * * * *